United States Patent
Tian et al.

(10) Patent No.: US 9,860,680 B2
(45) Date of Patent: Jan. 2, 2018

(54) AUTOMATIC CONNECTION OF BLUETOOTH HUMAN INTERFACE DEVICES

(75) Inventors: Dan Tian, Shanghai (CN); Junfeng Geng, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 14/397,371

(22) PCT Filed: Jun. 4, 2012
(Under 37 CFR 1.47)

(86) PCT No.: PCT/CN2012/076415
§ 371 (c)(1),
(2), (4) Date: May 15, 2015

(87) PCT Pub. No.: WO2013/181778
PCT Pub. Date: Dec. 12, 2013

(65) Prior Publication Data
US 2016/0014545 A1    Jan. 14, 2016

(51) Int. Cl.
*H04B 7/00* (2006.01)
*H04W 4/00* (2009.01)
(Continued)

(52) U.S. Cl.
CPC ........... *H04W 4/008* (2013.01); *H04W 8/005* (2013.01); *H04W 76/02* (2013.01)

(58) Field of Classification Search
CPC ..... H04W 84/18; H04W 24/00; H04W 28/06; H04W 28/18; H04W 4/008; H04W 12/06; H04W 48/16
(Continued)

(56) References Cited

U.S. PATENT DOCUMENTS 6,842,460 B1 * 1/2005 Olkkonen ............. H04W 48/16
370/328
7,589,726 B2    9/2009 Aholainen et al.
(Continued)

FOREIGN PATENT DOCUMENTS

CN    1423428    6/2003
CN    1430145    7/2003
(Continued)

OTHER PUBLICATIONS

"PCT Application No. PCT/CN2012/076415, International Search Report and Written Opinion", dated Mar. 7, 2013, 11 pages.
(Continued)

*Primary Examiner* — Ajibola Akinyemi
(74) *Attorney, Agent, or Firm* — DeLizio Law, PLLC

(57) ABSTRACT

A Bluetooth controller associated with a host device can be configured to automatically configure and setup a Bluetooth LE HID without the use of hidden menus or other setup options involving multiple steps (or other input devices). The Bluetooth controller executes background scan operations to detect at least one Bluetooth LE HID to connect to the host device. Each Bluetooth packet received at the Bluetooth controller is analyzed to determine whether the received Bluetooth packet is a predefined Bluetooth LE HID packet type transmitted by the Bluetooth LE HID. In response to determining that the received Bluetooth packet is a predefined Bluetooth LE HID packet type transmitted by the Bluetooth LE HID, the received Bluetooth packet is provided to a Bluetooth LE HID module of the Bluetooth controller. Otherwise, the received Bluetooth packet is provided to a Bluetooth HCI module of the Bluetooth controller.

29 Claims, 5 Drawing Sheets

(51) Int. Cl.
*H04W 8/00* (2009.01)
*H04W 76/02* (2009.01)

(58) Field of Classification Search
USPC .......................................... 455/41.2
See application file for complete search history.

(56) References Cited

U.S. PATENT DOCUMENTS

| | | | |
|---|---|---|---|
| 2006/0094461 | A1 | 5/2006 | Hameed et al. |
| 2006/0105712 | A1 | 5/2006 | Glass et al. |
| 2006/0268329 | A1 | 11/2006 | Lo |
| 2007/0297440 | A1 | 12/2007 | Moon |
| 2009/0055516 | A1 | 2/2009 | Zhodzishsky |
| 2009/0174530 | A1 | 7/2009 | Yen et al. |
| 2010/0035545 | A1* | 2/2010 | Ibrahim ............... H04W 24/00 455/41.2 |
| 2010/0120362 | A1 | 5/2010 | Walley et al. |
| 2010/0302979 | A1* | 12/2010 | Reunamaki ......... H04M 1/7253 370/311 |
| 2010/0317289 | A1 | 12/2010 | Desai et al. |
| 2011/0021142 | A1 | 1/2011 | Desai et al. |
| 2011/0319020 | A1 | 12/2011 | Desai et al. |
| 2012/0281638 | A1* | 11/2012 | Ly-Gagnon ........... H04W 8/005 370/329 |

FOREIGN PATENT DOCUMENTS

| | | |
|---|---|---|
| CN | 1484128 | 3/2004 |
| CN | 1956474 | 5/2007 |
| CN | 101340212 | 1/2009 |
| CN | 101789933 | 7/2010 |
| CN | 102118186 | 7/2011 |
| CN | 102130926 | 7/2011 |
| CN | 102137187 | 7/2011 |
| CN | 102299763 | 12/2011 |
| EP | 2498188 | 9/2012 |
| KR | 101080674 | 9/2012 |
| WO | 2009063272 | 5/2009 |

OTHER PUBLICATIONS

"Supplementary European Search Report", EP12878339—Search Authority—Munich—dated Jan. 11, 2016, dated Jan. 11, 2016, 8 pages.

Jack, "Bluetooth HID Solution", Baidu library, Mar. 26, 2012, pp. 1-5.

Zhaoshuzhaoshu, "Bluetooth HID Specification", Baidu library, Dec. 19, 2011, pp. 1-6.

* cited by examiner

AUTOMATIC CONNECTION OF BLUETOOTH HUMAN INTERFACE DEVICES

BACKGROUND

Embodiments of the inventive subject matter generally relate to the field of communication networks and, more particularly, to a Bluetooth® low energy (LE) mechanism for automatic connection of a Bluetooth human interface device (HID).

The Bluetooth wireless communication standard is typically employed for exchanging communications between fixed or mobile Bluetooth-enabled devices over relatively short distances. When a destination Bluetooth device is within range of an initiating Bluetooth device, the initiating Bluetooth device can cryptographically authenticate the destination Bluetooth device (also known as pairing) to validate the destination Bluetooth device. A Bluetooth communication link for exchanging communications can then be established between the initiating Bluetooth device and the destination Bluetooth device.

SUMMARY

In some embodiments, a method comprises: executing, at a Bluetooth controller associated with a host device, background scan operations to detect at least one Bluetooth device to connect the at least one Bluetooth device to the host device; receiving one or more Bluetooth packets at the Bluetooth controller in response to said executing the background scan operations to detect at least one Bluetooth device; analyzing each received Bluetooth packet to determine whether the received Bluetooth packet is a predefined Bluetooth LE HID packet type transmitted by the Bluetooth device; in response to determining that the received Bluetooth packet is a predefined Bluetooth LE HID packet type transmitted by the Bluetooth device, providing the received Bluetooth packet to a Bluetooth low energy (LE) human interface device (HID) module of the Bluetooth controller; and, in response to determining that the received Bluetooth packet is not a predefined Bluetooth LE HID packet type transmitted by the Bluetooth device, providing the received Bluetooth packet to a Bluetooth host controller interface (HCI) module of the Bluetooth controller.

In some embodiments, the method further comprises, in response to determining that the received Bluetooth packet is a predefined Bluetooth LE HID packet type transmitted by the Bluetooth device, determining whether the Bluetooth device is within a predetermined threshold distance of the Bluetooth controller; and, in response to determining that the Bluetooth device is within the predetermined threshold distance of the Bluetooth controller, executing one or more connection operations to pair and connect the Bluetooth device with the host device.

In some embodiments, said executing one or more connection operations to pair and connect the Bluetooth device with the host device further comprises mapping the Bluetooth device to a corresponding USB device through a USB interface to connect the Bluetooth device with the host device.

In some embodiments, the method further comprises storing configuration information associated with the Bluetooth device for subsequent reconnection between the Bluetooth device and the host device.

In some embodiments, said determining whether the Bluetooth device is within the predetermined threshold distance of the Bluetooth controller is based on analyzing at least one of a received signal strength indicator (RSSI) associated with the received Bluetooth packet, a radio signal path loss, and near field communication (NFC) signal detection.

In some embodiments, said determining whether the Bluetooth device is within the predetermined threshold distance of the Bluetooth controller comprises calculating a radio signal path loss value associated with the Bluetooth device based, at least in part, on a transmit power associated with the Bluetooth device, a radio signal loss value associated with an antenna of the Bluetooth controller, and a radio signal loss value associated with an antenna of the Bluetooth device; comparing the radio signal path loss value associated with the Bluetooth device against a threshold path loss; determining whether the Bluetooth device is within the predetermined threshold distance of the Bluetooth controller based on said comparing the radio signal path loss value associated with the Bluetooth device against a threshold path loss; determining that the Bluetooth device is within the predetermined threshold distance of the Bluetooth controller, in response to determining that the radio signal path loss value associated with the Bluetooth device is less than the threshold path loss; and determining that the Bluetooth device is not within the predetermined threshold distance of the Bluetooth controller, in response to determining that the radio signal path loss value associated with the Bluetooth device exceeds the threshold path loss.

In some embodiments, the method further comprises determining the transmit power associated with the Bluetooth device and the radio signal loss value associated with the antenna of the Bluetooth device from the received Bluetooth packet.

In some embodiments, in response to determining that the Bluetooth device is not within the predetermined threshold distance of the Bluetooth controller, the method further comprises discarding the received Bluetooth packet at the Bluetooth controller; and monitoring subsequent transmissions from the Bluetooth device to determine whether the Bluetooth device is within the predetermined threshold distance of the Bluetooth controller.

In some embodiments, said providing the received Bluetooth packet to the Bluetooth LE HID module of the Bluetooth controller is in response to determining that the Bluetooth device is within the predetermined threshold distance of the Bluetooth controller.

In some embodiments, said analyzing each received Bluetooth packet to determine whether the received Bluetooth packet is a predefined Bluetooth LE HID packet type transmitted by the Bluetooth device comprises determining a device type associated with a Bluetooth device that transmitted the received Bluetooth packet, based at least in part, on one or more fields of the received Bluetooth packet; and determining whether the Bluetooth device is a Bluetooth device based on the device type associated with a second Bluetooth device.

In some embodiments, the one or more fields of the received Bluetooth packet comprise at least a service universally unique identifier (UUID) of the received Bluetooth packet.

In some embodiments, a method comprises: executing, at a Bluetooth controller associated with a host device, background scan operations to detect at least one Bluetooth device to connect the at least one Bluetooth device to the host device; receiving one or more Bluetooth packets at the Bluetooth controller in response to said executing the background scan operations to detect at least one Bluetooth device; analyzing each received Bluetooth packet to determine whether the received Bluetooth packet is a predefined Bluetooth LE HID packet type transmitted by the Bluetooth device; in response to determining that the received Bluetooth packet is a predefined Bluetooth LE HID packet type transmitted by the Bluetooth device, determining whether the Bluetooth device is within a predetermined threshold distance of the Bluetooth controller; in response to determining that the Bluetooth device is within the predetermined threshold distance of the Bluetooth controller, executing one or more connection operations to pair and connect the Bluetooth device with the host device; in response to determining that the received Bluetooth packet is a predefined Bluetooth LE HID packet type transmitted by the Bluetooth device and in response to determining that the Bluetooth device is within the predetermined threshold distance of the Bluetooth controller, providing the received Bluetooth packet to a Bluetooth low energy (LE) human interface device (HID) module of the Bluetooth controller; and, in response to determining that the received Bluetooth packet is not a predefined Bluetooth LE HID packet type transmitted by the Bluetooth device, providing the received Bluetooth packet to a Bluetooth host controller interface (HCI) module of the Bluetooth controller.

In some embodiments, said executing one or more connection operations to pair and connect the Bluetooth device with the host device further comprises mapping the Bluetooth device to a corresponding USB HID through a USB interface to connect the Bluetooth device with the host device.

In some embodiments, in response to determining that the Bluetooth device is not within the predetermined threshold distance of the Bluetooth controller, the method further comprises discarding the received Bluetooth packet at the Bluetooth controller; and monitoring subsequent transmissions from the Bluetooth device to determine whether the Bluetooth device is within the predetermined threshold distance of the Bluetooth controller.

In some embodiments, the method further comprises storing configuration information associated with the Bluetooth device for subsequent reconnection between the Bluetooth device and the host device.

In some embodiments, a method comprises: receiving one or more Bluetooth packets at a Bluetooth controller associated with a host device; analyzing each received Bluetooth packet to determine whether the received Bluetooth packet is a predefined Bluetooth LE HID packet type transmitted by a Bluetooth device; in response to determining that the received Bluetooth packet is a predefined Bluetooth LE HID packet type transmitted by the Bluetooth device, determining whether the Bluetooth device is within a predetermined threshold distance of the Bluetooth controller; and, in response to determining that the Bluetooth device is within the predetermined threshold distance of the Bluetooth controller, executing one or more connection operations to pair and connect the Bluetooth device with the host device; and mapping the Bluetooth device to a corresponding USB HID through a USB interface to connect the Bluetooth device with the host device.

In some embodiments, the method further comprises executing, at the Bluetooth controller, background scan operations to detect at least one Bluetooth device, wherein said receiving the one or more Bluetooth packets at the Bluetooth controller is in response to said executing, at the Bluetooth controller, background scan operations to detect at least one Bluetooth device.

In some embodiments, in response to determining that the received Bluetooth packet is a predefined Bluetooth LE HID packet type transmitted by the Bluetooth device, providing the received Bluetooth packet to a Bluetooth low energy (LE) human interface device (HID) module of the Bluetooth controller; and, in response to determining that the received Bluetooth packet is not a predefined Bluetooth LE HID packet type transmitted by the Bluetooth device, providing the received Bluetooth packet to a Bluetooth host controller interface (HCI) module of the Bluetooth controller.

In some embodiments, the method further comprises storing configuration information associated with the Bluetooth device for subsequent reconnection between the Bluetooth device and the host device.

In some embodiments, a Bluetooth controller comprises: a Bluetooth low energy (LE) human interface device (HID) module operable to execute background scan operations to detect at least one Bluetooth device to connect the at least one Bluetooth device to a host device associated with the Bluetooth controller; and an LE HID filter operable to receive one or more Bluetooth packets at the Bluetooth controller in response to the Bluetooth LE HID module executing the background scan operations to detect at least one Bluetooth device; analyze each received Bluetooth packet to determine whether the received Bluetooth packet is a predefined Bluetooth LE HID packet type transmitted by the Bluetooth device; in response to the LE HID filter determining that the received Bluetooth packet is a predefined Bluetooth LE HID packet type transmitted by the Bluetooth device, provide the received Bluetooth packet to the Bluetooth LE HID module of the Bluetooth controller; and, in response to the LE HID filter determining that the received Bluetooth packet is not a predefined Bluetooth LE HID packet type transmitted by the Bluetooth device, provide the received Bluetooth packet to a Bluetooth host controller interface (HCI) module of the Bluetooth controller.

In some embodiments, the LE HID filter is further operable to, in response to the LE HID filter determining that the received Bluetooth packet is a predefined Bluetooth LE HID packet type transmitted by the Bluetooth device, determine whether the Bluetooth device is within a predetermined threshold distance of the Bluetooth controller; and, in response to the LE HID filter determining that the Bluetooth device is within the predetermined threshold distance of the Bluetooth controller, cause the Bluetooth LE HID module to execute one or more connection operations to pair and connect the Bluetooth device with the host device.

In some embodiments, the LE HID filter operable to cause the Bluetooth LE HID module to execute one or more connection operations to pair and connect the Bluetooth device with the host device further comprises the LE HID filter operable to map the Bluetooth device to a corresponding USB device through a USB interface to connect the Bluetooth device with the host device.

In some embodiments, the LE HID filter operable to determine whether the Bluetooth device is within the predetermined threshold distance of the Bluetooth controller comprises the LE HID filter operable to calculate a radio signal path loss value associated with the Bluetooth device based, at least in part, on a transmit power associated with the Bluetooth device, a radio signal loss value associated with an antenna of the Bluetooth controller, and a radio signal loss value associated with an antenna of the Bluetooth device; compare the radio signal path loss value associated with the Bluetooth device against a threshold path loss; determine whether the Bluetooth device is within the predetermined threshold distance of the Bluetooth controller based on the LE HID filter comparing the radio signal path loss value associated with the Bluetooth device against a threshold path loss; determine that the Bluetooth device is within the predetermined threshold distance of the Bluetooth controller, in response to the LE HID filter determining that the radio signal path loss value associated with the Bluetooth device is less than the threshold path loss; and determine that the Bluetooth device is not within the predetermined threshold distance of the Bluetooth controller, in response to the LE HID filter determining that the radio signal path loss value associated with the Bluetooth device exceeds the threshold path loss.

In some embodiments, in response to the LE HID filter determining that the Bluetooth device is not within the predetermined threshold distance of the Bluetooth controller, the LE HID filter is further operable to discard the received Bluetooth packet; and monitor subsequent transmissions from the Bluetooth device to determine whether the Bluetooth device is within the predetermined threshold distance of the Bluetooth controller.

In some embodiments, the LE HID filter operable to provide the received Bluetooth packet to the Bluetooth LE HID module of the Bluetooth controller is in response to the LE HID filter determining that the Bluetooth device is within the predetermined threshold distance of the Bluetooth controller.

In some embodiments, one or more machine-readable storage media having instructions stored therein, which when executed by one or more processors causes the one or more processors to perform operations that comprise: executing, at a Bluetooth controller associated with a host device, background scan operations to detect at least one Bluetooth device to connect the at least one Bluetooth device to the host device; receiving one or more Bluetooth packets at the Bluetooth controller in response to said operation of executing the background scan operations to detect at least one Bluetooth device; analyzing each received Bluetooth packet to determine whether the received Bluetooth packet is a predefined Bluetooth LE HID packet type transmitted by the Bluetooth device; in response to determining that the received Bluetooth packet is a predefined Bluetooth LE HID packet type transmitted by the Bluetooth device, providing the received Bluetooth packet to a Bluetooth low energy (LE) human interface device (HID) module of the Bluetooth controller; and, in response to determining that the received Bluetooth packet is not a predefined Bluetooth LE HID packet type transmitted by the Bluetooth device, providing the received Bluetooth packet to a Bluetooth host controller interface (HCI) module of the Bluetooth controller.

In some embodiments, the operations further comprise, in response to determining that the received Bluetooth packet is a predefined Bluetooth LE HID packet type transmitted by the Bluetooth device, determining whether the Bluetooth device is within a predetermined threshold distance of the Bluetooth controller; and, in response to determining that the Bluetooth device is within the predetermined threshold distance of the Bluetooth controller, executing one or more connection operations to pair and connect the Bluetooth device with the host device.

In some embodiments, said operation of executing one or more connection operations to pair and connect the Bluetooth device with the host device further comprises mapping the Bluetooth device to a corresponding USB device through a USB interface to connect the Bluetooth device with the host device.

In some embodiments, said operation of determining whether the Bluetooth device is within the predetermined threshold distance of the Bluetooth controller comprises calculating a radio signal path loss value associated with the Bluetooth device based, at least in part, on a transmit power associated with the Bluetooth device, a radio signal loss value associated with an antenna of the Bluetooth controller, and a radio signal loss value associated with an antenna of the Bluetooth device; comparing the radio signal path loss value associated with the Bluetooth device against a threshold path loss; determining whether the Bluetooth device is within the predetermined threshold distance of the Bluetooth controller based on said operation of comparing the radio signal path loss value associated with the Bluetooth device against a threshold path loss; determining that the Bluetooth device is within the predetermined threshold distance of the Bluetooth controller, in response to determining that the radio signal path loss value associated with the Bluetooth device is less than the threshold path loss; and determining that the Bluetooth device is not within the predetermined threshold distance of the Bluetooth controller, in response to determining that the radio signal path loss value associated with the Bluetooth device exceeds the threshold path loss.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
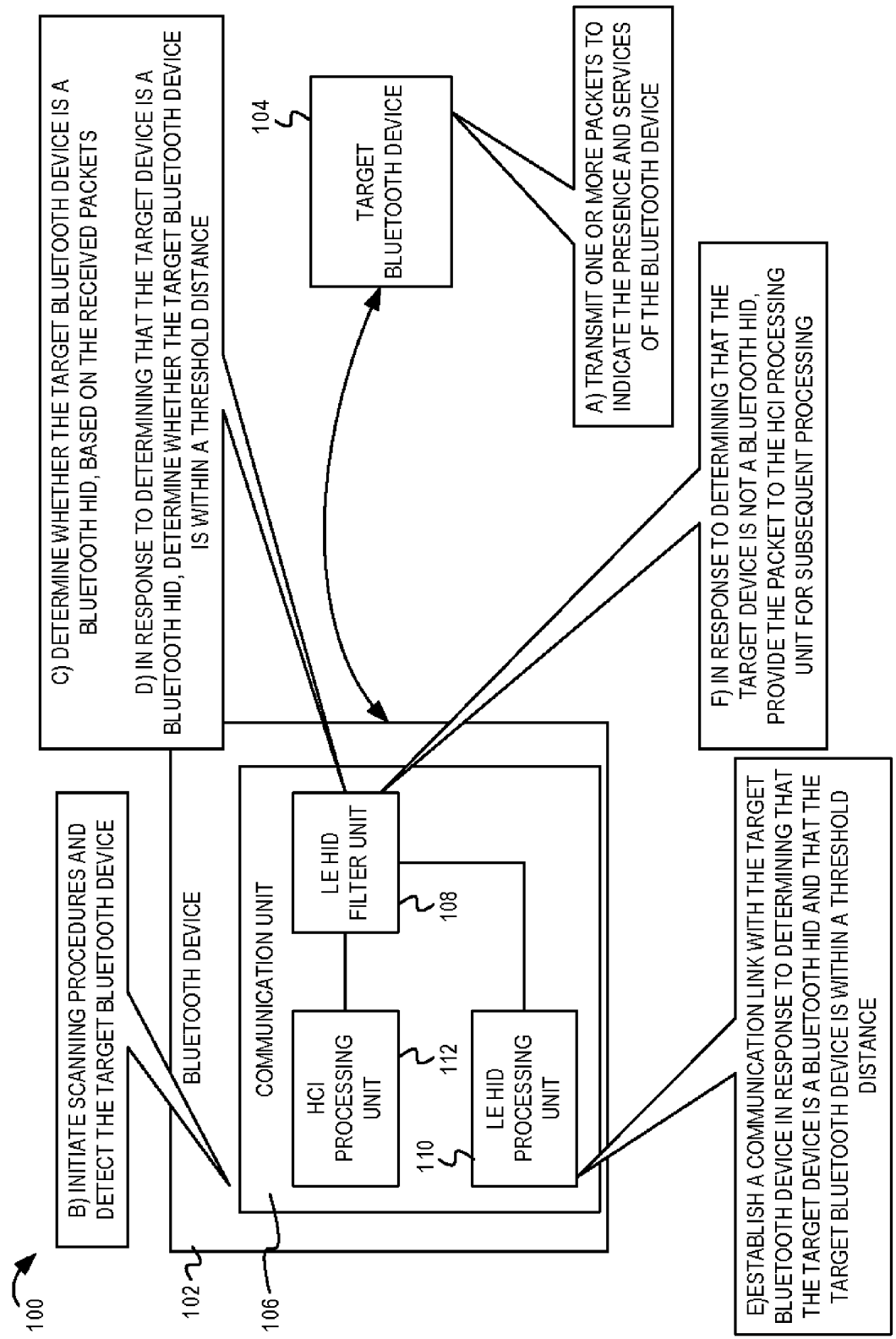
FIG. 1 is a block diagram illustrating a Bluetooth LE mechanism for automatic connection of Bluetooth LE HIDs.

The description that follows includes exemplary systems, methods, techniques, instruction sequences, and computer program products that embody techniques of the present inventive subject matter. However, it is understood that the described embodiments may be practiced without these specific details. For instance, although examples refer to a low energy mechanism for automatically establishing a communication link with Bluetooth LE HIDs; in other embodiments, the operations described herein can be employed to automatically establish a communication link with devices that implement other suitable communication standards (e.g., Bluetooth host controller interface (HCI) devices). In other instances, well-known instruction instances, protocols, structures, and techniques have not been shown in detail in order not to obfuscate the description.

Configuration of a Bluetooth HID (e.g., a Bluetooth-enabled keyboard, a Bluetooth-enabled mouse) typically relies on a Bluetooth HID layer and Bluetooth driver software, both of which may be implemented by a host device's operating system. Because different host devices can implement different types of (and versions of) operating systems, this can make it difficult to standardize operations for configuring the Bluetooth HID across the different operating systems. Furthermore, to connect the Bluetooth HID to a host electronic device (e.g., to connect a Bluetooth-enabled mouse to a computer system), a user typically goes through a series of connection steps and clicks though various options on a menu. However, to use this menu, the user may utilize another input device (e.g., a universal serial bus (USB) enabled keyboard or a USB mouse) that is already configured to operate with the host electronic device. Problems can arise if there are no previously configured input devices that can be used to connect the Bluetooth HID (e.g., the Bluetooth-enabled keyboard or Bluetooth-enabled mouse) to the host electronic device. For example, the user may encounter a problem if he/she has not paired the Bluetooth-enabled keyboard in host operating system, but the host operating system requires the user to provide an input using a keyboard at a login window. Some existing techniques incorporate the Bluetooth basic rate (BR) or extended data rate (EDR) HID layer into Bluetooth controller. The Bluetooth controller operates in a Bluetooth HID mode before the host device's operating system boots and loads the Bluetooth host drivers (e.g., in a pre-boot mode). After the host device's operating system loads the Bluetooth host drivers, the Bluetooth controller can be switched to a standard Bluetooth HCI mode. The Bluetooth host drivers and Bluetooth HID layer in the host device take over the Bluetooth HID connection. However, these techniques for switching between Bluetooth operating modes typically require the Bluetooth drivers on the host device to implement special functionality to operate in conjunction with the Bluetooth controller and to handle the switch between Bluetooth operating modes. Implementing special functionality for multiple operating systems can be difficult and costly. Moreover, the Bluetooth HIDs may not be automatically paired with the host device and may rely on user input. Some existing techniques can employ a push button mechanism to configure/pair the Bluetooth-enabled keyboard with the host device by pushing a button on the Bluetooth-enabled keyboard and/or the host device. However, the push button configuration process can be difficult, may be susceptible to security and privacy issues, and may not be user-friendly. Furthermore, implementing a push button mechanism can increase the cost and complexity of the Bluetooth devices.

Figure 2:
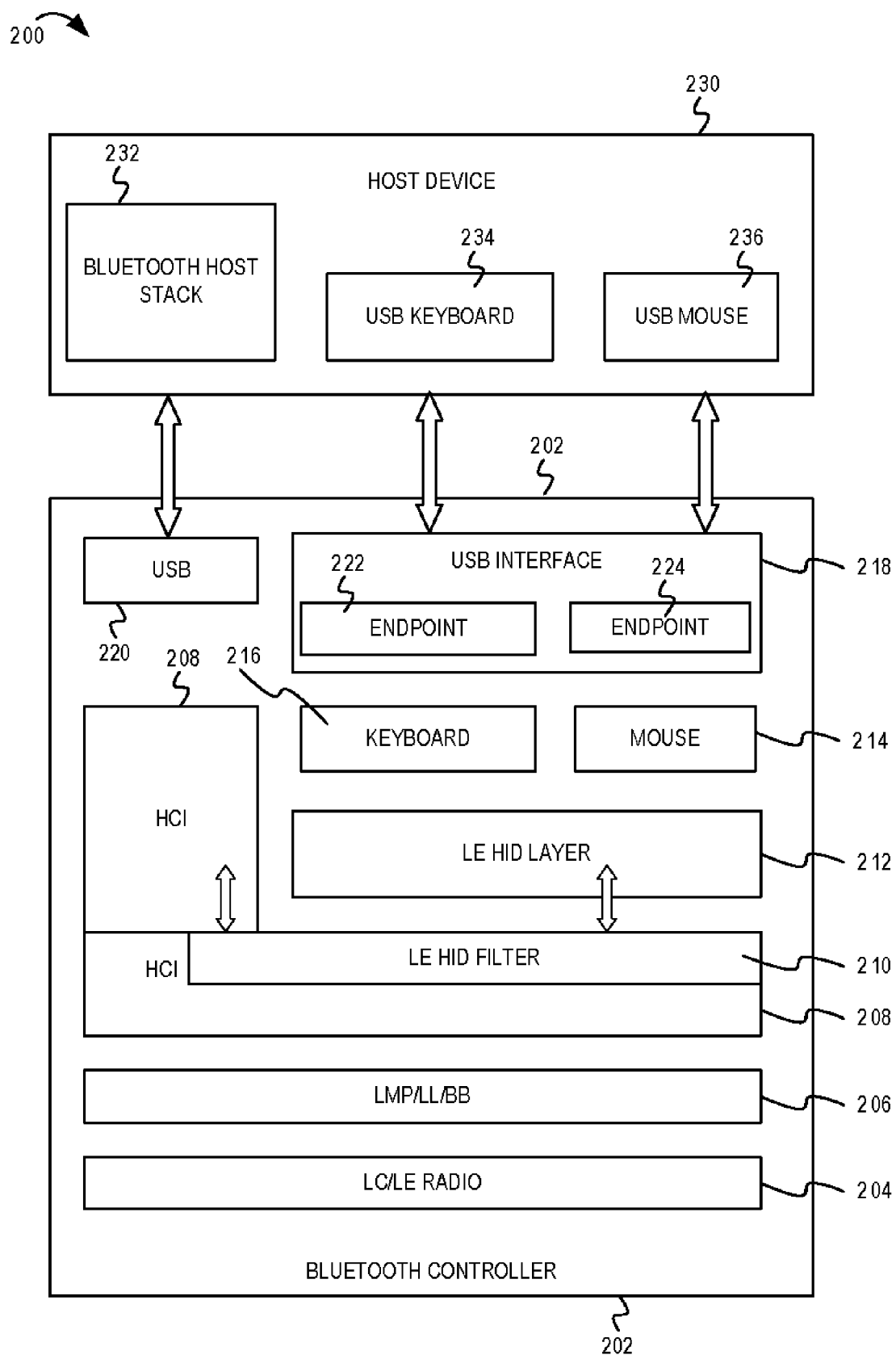
FIG. 2 is a block diagram illustrating example architecture of a Bluetooth device for automatic pairing/configuration of Bluetooth LE HIDs.

Various embodiments can be employed to automatically configure and setup a Bluetooth LE HID (e.g., a Bluetooth-enabled keyboard, mouse, joystick, or another suitable Bluetooth HID) without the use of hidden menus or other setup options requiring multiple steps (or other input devices). In some embodiments, a Bluetooth controller (associated with a host device) can be configured to include a Bluetooth LE HID processing layer, a Bluetooth LE HID filter, and a USB interface as depicted in FIG. 2. The Bluetooth LE HID connections (e.g., with the Bluetooth-enabled keyboard, etc.) can be mapped to a standard USB HID, thus precluding the need for Bluetooth driver support at the host device, precluding the need for changes to the host device's operating system, and enabling compatibility with different operating systems. The Bluetooth controller can then scan for Bluetooth devices in the vicinity of the host device. In response to receiving a packet at the Bluetooth controller, an LE HID filter of the Bluetooth controller can automatically determine whether the detected Bluetooth device is a Bluetooth LE HID. If so, the LE HID filter can determine whether the Bluetooth LE HID is within a threshold distance of the predetermined distance. If the Bluetooth LE HID is within a threshold distance of the predetermined distance, the LE HID filter can prompt an LE HID processing layer of the Bluetooth controller to establish an LE HID connection between the host device and the Bluetooth LE HID. Otherwise, the LE HID filter can provide the packet to an HCI processing layer of the Bluetooth controller. Such a technique for automatic connection and pairing of Bluetooth LE HIDs can be low cost, preclude the need for using cable (or USB) HIDs (e.g., a USB keyboard) for setting up the Bluetooth LE HIDs, power efficient, and intuitive and easy to use for the users.

FIG. 1 is a block diagram illustrating a Bluetooth LE mechanism for automatic connection of Bluetooth LE HIDs. FIG. 1 depicts a wireless communication network 100 including Bluetooth devices 102 and 104. The Bluetooth device 102 comprises a communication unit 106. The communication unit 106 comprises a low energy (LE) human interface device (HID) filter unit 108, a LE HID processing unit 110, and a HCI processing unit 112. The communication unit 106 can implement protocols and functionality to enable Bluetooth communication in the wireless communication network 100. In some embodiments, in addition to Bluetooth communication protocols, the communication unit 106 can implement other protocols and functionality to enable other types of communications (e.g., wireless local area network (WLAN), Ethernet, WiMAX, powerline communications, etc.). As will be described below, the Bluetooth device 102 initiates establishment of the communication link and is herein referred to as a "scanning Bluetooth device." The Bluetooth device 104 with which the communication link is established is herein referred to as a "target Bluetooth device." In some embodiments, the scanning Bluetooth device 102 can be an electronic device with Bluetooth communication capabilities, such as a laptop computer, a tablet computer, a mobile phone, a smart appliance, a gaming console, a desktop computer, an access point, or other suitable electronic devices. The scanning Bluetooth device 102 can execute operations for establishing a communication link with the target Bluetooth device 104 depending on the type of the Bluetooth device 104, as will be described below in stages A-F and further in FIG. 4.

At stage A, the Bluetooth device 104 transmits one or more packets to indicate the presence and services of the Bluetooth device 104. For example, a communication unit (not shown) of the Bluetooth device 104 can broadcast one or more advertising packets to indicate the presence of the Bluetooth device 104 in the wireless communication network 100 and to advertise services and capabilities of the Bluetooth device 104.

At stage B, the scanning Bluetooth device 102 initiates scanning procedures and detects the target Bluetooth device 104. For example, the communication unit 106 of the scanning Bluetooth device 102 can scan for advertising packets to determine whether there are any Bluetooth devices in the wireless communication network 100 with which the scanning Bluetooth device 102 can establish a communication link. The communication unit 106 can detect the one or more advertising packets (transmitted by the Bluetooth device 104 at stage A) and can accordingly detect the Bluetooth device 104.

At stage C, the LE HID filter unit 108 of the scanning Bluetooth device 102 can determine whether the target Bluetooth device 104 is a Bluetooth LE HID, based on the one or more received packets. As will be further described in FIG. 4, the LE HID filter unit 108 can analyze one or more fields in the received packets to determine whether the Bluetooth device 104 that transmitted the packets is a Bluetooth LE HID. As described above, a Bluetooth LE HID can be a suitable user input device (e.g., a Bluetooth-enabled keyboard, a Bluetooth-enabled mouse, a Bluetooth-enabled joystick, and other suitable Bluetooth controller/device/remote/etc.) that implements the Bluetooth communication protocol.

At stage D, in response to determining that the target Bluetooth device 104 is a Bluetooth LE HID, the LE HID filter unit 108 can determine whether the target Bluetooth device 104 is within a threshold distance of the scanning Bluetooth device 102. As will further be described in FIG. 4, the LE HID filter unit 108 can employ a suitable mechanism to determine whether the target Bluetooth device 104 is within the predetermined threshold distance of the communication unit 106 (and the scanning Bluetooth device 102).

At stage E, the LE HID processing unit 110 of the Bluetooth device 102 establishes a communication link with the target Bluetooth device 104 in response to determining that the target Bluetooth device 104 is a Bluetooth LE HID and in response to determining that the target Bluetooth device 104 is within the threshold distance of the scanning Bluetooth device 102. In one example as will be described in FIG. 4, after the LE HID filter unit 108 determines that the target Bluetooth device 104 is a Bluetooth LE HID and that the target Bluetooth device 104 is within the threshold distance of the communication unit 106, the LE HID filter unit 108 can provide the received packets to the LE HID processing unit 110. The LE HID processing unit 110 can then execute suitable operations for pairing the scanning Bluetooth device 102 with the target Bluetooth device 104 and for establishing a communication link between the scanning Bluetooth device 102 and the target Bluetooth device 104. However, if the LE HID filter unit 108 determines that the target Bluetooth device 104 is a Bluetooth LE HID but that the target Bluetooth device 104 is not within the threshold distance of the communication unit 106, the LE HID filter unit 108 can discard the received packet and can continue to determine whether the target Bluetooth device 104 is within the threshold distance of the communication unit 106.

At stage F, the LE HID filter unit 108 provides the packet to the HCI processing unit 112 for subsequent processing, in response to determining that the target Bluetooth device 104 is not a Bluetooth LE HID. In some embodiments, if the target Bluetooth device 104 is not a Bluetooth LE HID, the Bluetooth device 104 can be deemed to be a Bluetooth HCI device. Some examples of Bluetooth HCI devices can include a Bluetooth-enabled mobile phone, Bluetooth-enabled smart appliances, a Bluetooth-enabled headset, etc. The HCI processing unit 112 can then execute suitable operations for processing the received packets from the Bluetooth HCI device 104.

To enable automatic pairing and connection of the Bluetooth LE HIDs, a Bluetooth controller (not depicted in FIG. 1) of the Bluetooth device 102 can be modified to include the LE HID filter unit 108, the LE HID processing unit 110, and a USB interface (that couples to USB devices associated with the host device). In some embodiments, the Bluetooth LE connections can be mapped from the Bluetooth controller to the USB HID interface of the host device via a USB composite interface implemented on the Bluetooth controller, as depicted in FIG. 2. In other embodiments, the Bluetooth LE connections can be mapped from the Bluetooth controller to the USB HID interface of the host device via a USB hub implemented on the Bluetooth controller, as will be further depicted in FIG. 3.

FIG. 2 is a block diagram illustrating example architecture of a Bluetooth device 200 for automatic pairing/configuration of Bluetooth LE HIDs. The Bluetooth device 200 comprises a host device 230 and a Bluetooth controller 202. The protocol stack for the Bluetooth controller 202 comprises a link controller (LC) and low energy (LE) radio layer, depicted as LC/LE radio 204. A link management protocol (LMP), link layer (LL), and baseband (BB) layer (depicted in FIG. 2 as LMP/LL/BB 206) is implemented across the LC/LE Radio layer 204. A host controller interface (HCI) layer 208 is implemented across the LMP/LL/BB layer 206. Additionally, the LE HID layer 212 is implemented across a part of the HCI layer 208. A keyboard layer 216 and a mouse layer 214 are implemented across the LE HID layer 212. A USB interface 218 is implemented across the keyboard layer 216 and the mouse layer 214; while a USB HCI interface 220 is implemented across the HCI layer 208. The HCI layer 208 also comprises an LE HID filter 210. The protocol stack for the host device 230 comprises a Bluetooth host stack 232, a USB keyboard layer 234, and a USB mouse layer 236. In some embodiments, the LE HID layer 212, the USB HCI interface 220, and the USB interface 218 can be integrated into the Bluetooth controller 202 as depicted by the Bluetooth controller architecture of FIG. 2. The LE HID connections can be mapped to standard USB HID endpoints 222 and 224 (e.g., a keyboard, a mouse, a joystick, and/or other suitable types of endpoints depending on the configuration of the host device 230). In some embodiments, as depicted in FIG. 2, the number of USB HID endpoints 222 and 224 implemented on the Bluetooth controller 202 can be equal to the number of USB devices supported by the host device 230. In other embodiments, the number of USB HID endpoints implemented on the Bluetooth controller 202 can be different from the number of USB devices supported by the host device 230. In some embodiments, the Bluetooth controller 202 can be implemented as part of the host device 230 (e.g., as part of the same circuit board, integrated circuit, or system as the host device). For example, the Bluetooth controller 202 can be implemented on a module (e.g., a system on a chip (SoC), integrated circuit (IC), a circuit board, etc.) that is integrated or coupled with the host device 230 within a system. In another embodiment, the Bluetooth controller 202 can be implemented on a circuit board or integrated circuit that is separate from the host device 230. For example, the Bluetooth controller 202 can be implemented on a pluggable module (e.g., a dongle, a pluggable circuit board, a pluggable IC, etc.) that can be connected to or disconnected from the host device 230 by the user.

In some embodiments, the Bluetooth controller 202 and the Bluetooth host stack 232 can comprise standard Bluetooth functionality for processing Bluetooth events. In some embodiments, the LE HID filter 210 of the Bluetooth controller 202 can be implemented as part of the HCI layer 208, as depicted in FIG. 2. In other embodiments, however, the LE HID filter 210 can be implemented across (and separate from) the HCI layer 208 in the Bluetooth controller 202. The LE HID filter 210 can parse LE HID related data, events and commands. If a received LE data packet comprises data associated with LE HIDs (e.g., Bluetooth-enabled keyboard, Bluetooth-enabled mouse), the LE data packet can be intercepted and can be forwarded only to the LE HID layer 212. All other data packets can be provided to the HCI layer 208 and to the host operating system (e.g., the Bluetooth host stack 232 in the host device 230). In some embodiments as depicted in FIG. 2, only the protocol stack of the Bluetooth controller 202 may be modified to include the LE HID filter 210 and the USB interface 218 to map to corresponding USB devices of the host device 230. The host device 230 itself may not be modified. This can ensure that the user experience is always the same and can preclude the need for updating the operating system of the host device 230.

As depicted in FIG. 2, the LE HID layer 212 can be incorporated into the Bluetooth controller 202 and the HID connections can be mapped to standard USB HIDs. When the Bluetooth controller 202 comprises the LE HID layer 212 in conjunction with the HCI layer 208, the Bluetooth controller 202 can simultaneously operate in an HCI operating mode and in an HID operating mode. This can preclude the need for Bluetooth driver support at the host device 230, thus enabling compatibility with various host device operating systems, since most operating systems support standard USB HID connections and operations. In some embodiments, the LE HID layer 212 (instead of a Bluetooth basic rate (BR) or extended data rate (EDR) HID layer) may be incorporated into the Bluetooth controller 202 for improved power conservation, minimal interference with other wireless communication devices and protocols, minimal interference with other Bluetooth communication protocols (e.g., BR/EDR data communication), ease of implementation, lower resource consumption, etc. Furthermore, because Bluetooth low energy (LE) layers typically have a lighter data load link as compared to Bluetooth BR/EDR layers, incorporating the LE HID layer 212 (instead of the Bluetooth BR/EDR HID layer) into the Bluetooth controller 202 may be easier. Once the LE HID layer 212 is incorporated into the Bluetooth controller 202, the Bluetooth controller 202 can execute operations described in FIGS. 1 and 3 for automatically identifying, pairing, and connecting the Bluetooth LE HID with the host device 230, without any user intervention or user input. Thus, users can connect the Bluetooth LE HID (e.g., Bluetooth-enabled keyboard, Bluetooth-enabled mouse, etc.) with the host device 230 irrespective of the operating mode of the host device (e.g., BIOS mode, at log-in window, in OS safe mode or in OS normal mode, etc.) and irrespective of the operating system executing on the host device 230.

Figure 3:
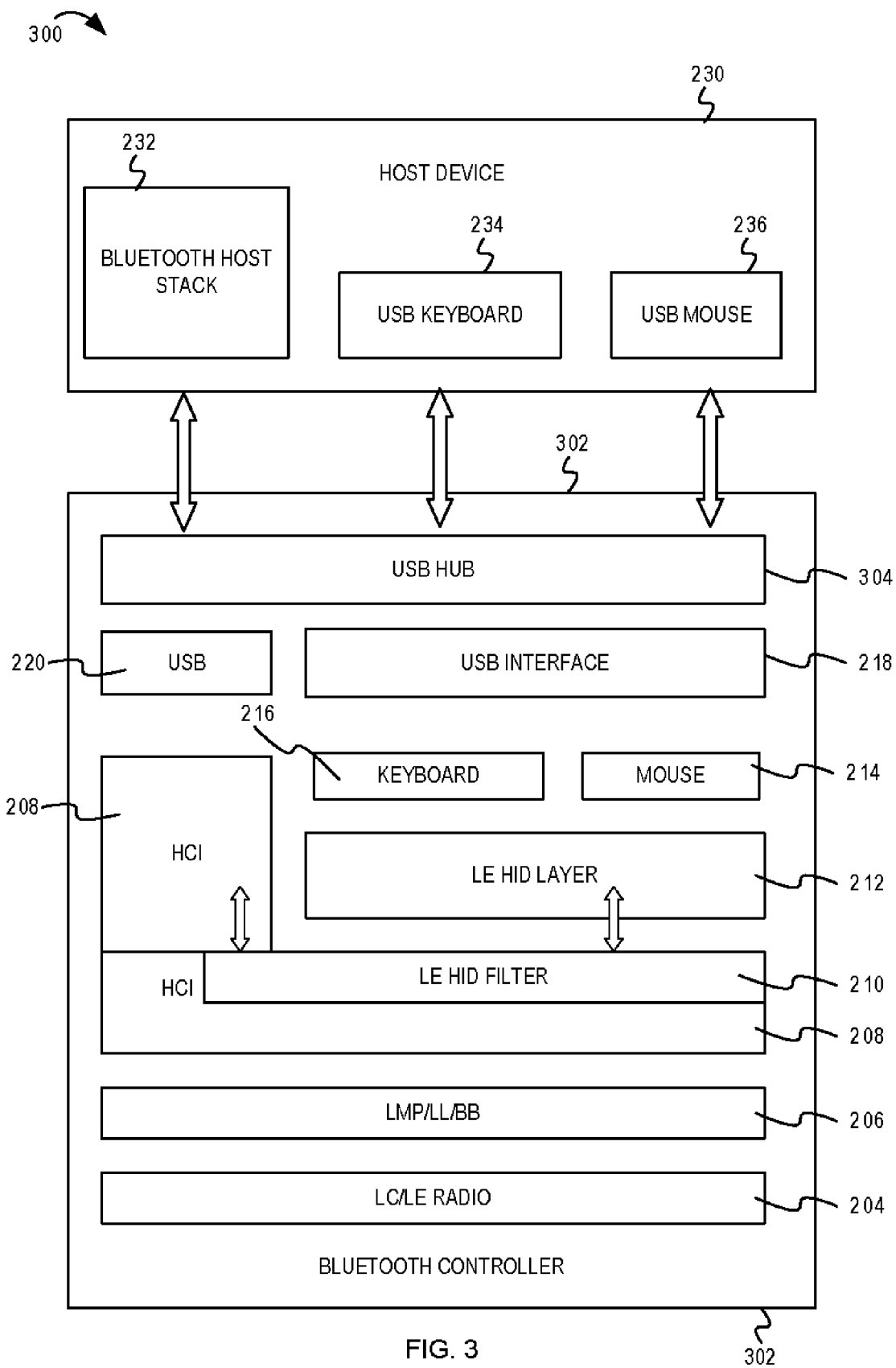
FIG. 3 is a block diagram illustrating another example architecture of a Bluetooth device for automatic pairing/configuration of Bluetooth LE HIDs.

FIG. 3 is a block diagram illustrating another example architecture of a Bluetooth device for automatic pairing and connection of Bluetooth LE HIDs. FIG. 3 depicts a Bluetooth device 300 including the host device 230 and a Bluetooth controller 302. The Bluetooth controller 302 is implemented similar to the Bluetooth controller 202 of FIG. 2. However, as depicted in FIG. 3, the Bluetooth controller 302 comprises a USB hub 304 implemented across the USB interface 218 and the USB HCI interface 220. Each Bluetooth HID instance 216 and 214 can operate as a single USB HID controller and can simultaneously communicate with the USB components 234 and 236 of the host device 230 via the USB hub 304. The architecture of the Bluetooth controller 302 as depicted in FIG. 3 can preclude the need for any changes to the host drivers. It should also be understood that although the Bluetooth controller 302 and the host device 230 are configured for two USB devices, embodiments are not so limited. In other embodiments, the Bluetooth controller 302 and the host device 230 can be configured for any suitable number of USB devices. The USB hub 304 of the Bluetooth controller 302 can couple the keyboard/mouse interfaces of the Bluetooth controller 302 to corresponding interfaces on the host device 230. In some embodiments as depicted in FIG. 3, the host device 230 may be oblivious to the number and type of devices supported by the Bluetooth controller 302 and may interact with the device interfaces of the Bluetooth controller 302 via the USB hub 304. In other embodiments as depicted in FIG. 2, the host device 230 may have knowledge of the number and type of devices supported by the Bluetooth controller 202 and may directly interact with the device interfaces of the Bluetooth controller 202.

Figure 4:
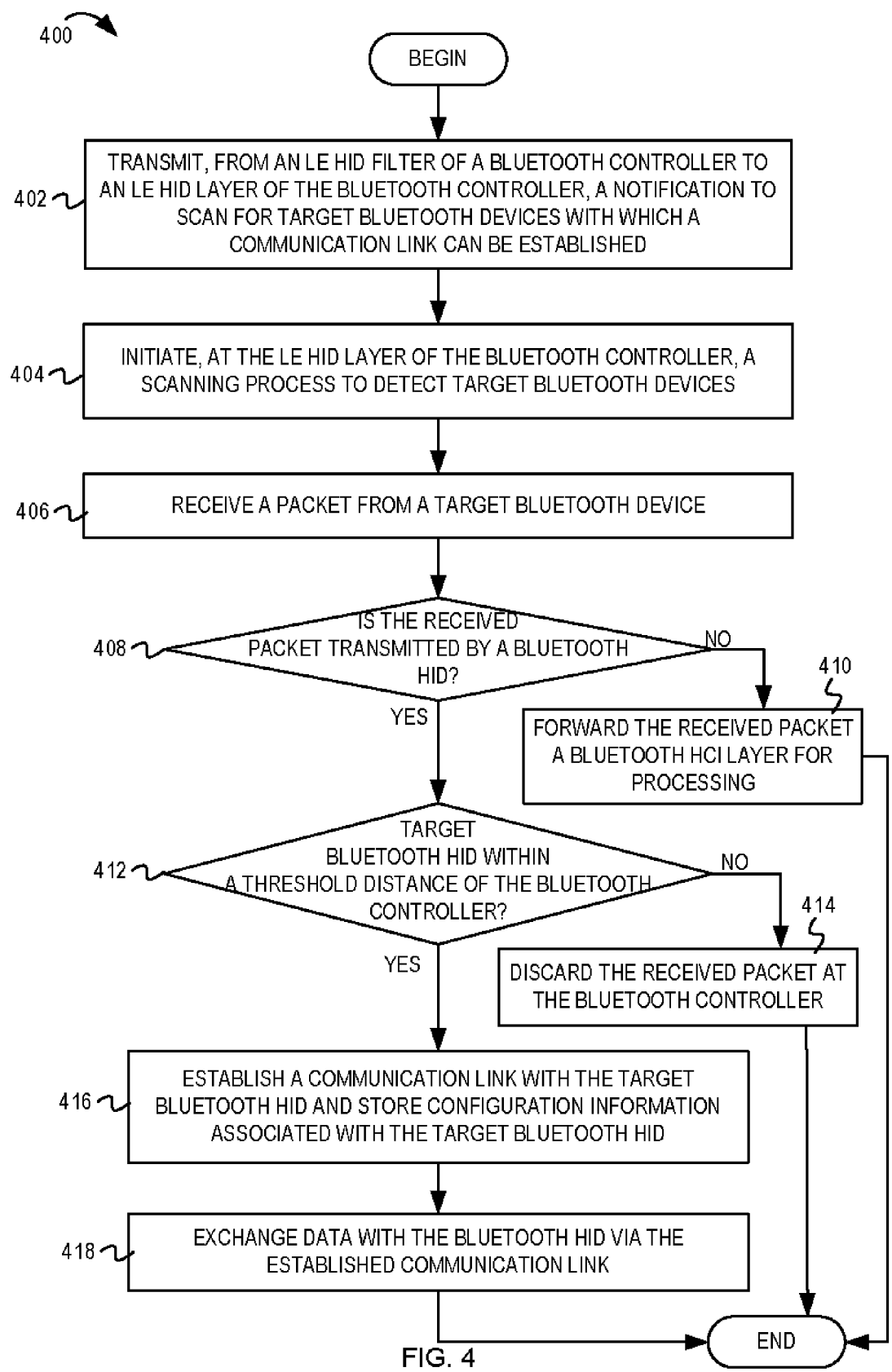
FIG. 4 is a flow diagram illustrating example operations of a Bluetooth controller for automatic pairing/configuration of Bluetooth LE HIDs.

FIG. 4 is a flow diagram ("flow") 400 illustrating example operations of a Bluetooth controller for automatic HID connection. The flow 400 begins at block 402.

At block 402, an LE HID filter of a Bluetooth controller notifies an LE HID layer of the Bluetooth controller to scan for target Bluetooth devices with which a communication link can be established. With reference to the example of FIG. 2, the LE HID filter 210 of the Bluetooth controller 202 can transmit a command to the LE HID layer 212 of the Bluetooth controller 202 to indicate that the LE HID layer 212 should scan for target Bluetooth devices with which a communication link can be established. In some embodiments, the LE HID filter 210 can prompt the LE HID layer 212 to scan for target Bluetooth devices at periodic intervals. The flow continues at block 404.

At block 404, the LE HID layer initiates a scanning process to detect the target Bluetooth devices. For example, in response to receiving the command (transmitted at block 402) from the LE HID filter 210, the LE HID layer 212 can initiate a background scanning process to detect target Bluetooth devices with which a communication link can be established. In some embodiments, the LE HID layer 212 can assign the background scanning process a lowest priority. In other words, if the LE HID layer 212 is assigned another higher priority task to execute, the background scanning process can be temporarily suspended. Although the LE HID layer 212 scans for target Bluetooth devices in response to a notification from the LE HID filter 210; in other embodiments, the LE HID layer 212 can automatically scan for target Bluetooth devices at periodic (or random or pre-programmed) time intervals. The flow continues at block 406.

At block 406, a packet is received from a target Bluetooth device. For example, suppose that a Bluetooth mouse is to be connected to a personal computer (e.g., the host device 230) that implements the Bluetooth controller 202. When the Bluetooth mouse is activated (e.g., switched ON), the Bluetooth mouse can transmit one or more advertising packets to announce its presence in the communication network and to advertise its services and capabilities. The advertising packet can also comprise an indication of the transmit power level associated with the target Bluetooth device. As a result of the background scanning process initiated at block 404, the LE HID filter 210 can receive an advertising packet from a target Bluetooth device (e.g., from the Bluetooth mouse). The LE HID filter 210 can use the received advertising packet (or other suitable received packets) to determine whether to establish a communication link with the Bluetooth device that transmitted the packet, as will be further described below. The flow continues at block 408.

At block 408, it is determined whether the received packet was transmitted by a Bluetooth HID. For example, the LE HID filter 210 can determine whether the received packet was transmitted by a Bluetooth LE HID or by a non-HID (e.g., a Bluetooth HCI device). Some examples of Bluetooth LE HIDs can include user input devices, such as Bluetooth-enabled mice, Bluetooth-enabled keyboards, Bluetooth-enabled joysticks, etc. Some examples of other non-HIDs can include Bluetooth mobile phones, Bluetooth headsets, other suitable Bluetooth HCI devices, etc. The LE HID filter 210 can determine whether the packet was received (at block 406) from a Bluetooth LE HID based on the fields/content of the received packet. For example, the LE HID filter 210 can use service universally unique identifiers (UUIDs) in the body of the packet to determine the type of the device and to determine whether the packet was received from a Bluetooth LE HID. If it is determined that the received packet was not transmitted by the Bluetooth LE HID, the flow continues at block 410. If it is determined that the received packet was transmitted by the Bluetooth LE HID, the flow continues at block 412.

At block 410, the received packet is forwarded to a Bluetooth HCI layer for further processing. The flow 400 moves from block 408 to block 410 if the LE HID filter 210 determines that a Bluetooth LE HID did not transmit the packet received at block 406. Accordingly, the LE HID filter 210 can forward the received packet to the Bluetooth HCI layer 208 of the Bluetooth controller 202 for subsequent processing. From block 410, the flow ends.

At block 412, it is determined whether the Bluetooth LE HID is within a threshold distance of the Bluetooth controller. The flow 400 moves from block 408 to block 412 if the LE HID filter 210 determines that a Bluetooth LE HID (e.g., a Bluetooth mouse) transmitted the packet received at block 406. Accordingly, the LE HID filter 210 can determine whether the target Bluetooth LE HID is within the threshold distance of the Bluetooth controller 202. The LE HID filter 210 can monitor RSSI values, use near field communication signal detection, and other suitable distance indicators to determine whether the target Bluetooth LE HID is within the threshold distance of the Bluetooth controller 202. In some embodiments, the LE HID filter 210 may also calculate a radio signal path loss based, at least in part, on the RSSI values. For example, the LE HID filter 210 can determine whether the target Bluetooth LE HID is within the threshold distance of the Bluetooth controller 202 by calculating the radio signal path loss ($P_L$) value associated with the target Bluetooth LE HID in accordance with Eq. 1.

In Eq. 1, $P_T$ is the transmit power associated with the target Bluetooth LE HID, $V_A$ is the radio signal loss value (in dB) associated with the scanning Bluetooth device's antenna, $V_B$ is the radio signal loss value (in dB) associated with the target Bluetooth LE HID's antenna, and $RSSI_B$ is the radio signal strength value of the target Bluetooth LE HID as measured at the Bluetooth controller 202. The values of $V_A$ and $V_B$ can be predetermined during a device manufacturing stage. The value of $P_T$ can be provided from the target Bluetooth LE HID in one or more advertising packets (received at block 406). In some embodiments, the value of $V_B$ may not be directly transmitted from the target Bluetooth LE HID to the Bluetooth controller 202 (e.g., in an advertising packet). Instead, in this embodiment, the target Bluetooth LE HID can subtract the radio signal loss value ($V_B$) from its transmit power and can transmit the resultant transmit power ($\hat{P}_T$) to the Bluetooth controller 202. Thus, the resultant transmit power ($\hat{P}_T$) can be represented by Eq. 2 and the radio signal path loss ($P_L$) value associated with the target Bluetooth LE HID can be calculated in accordance with Eq. 3. It should be noted that in other embodiments, the target Bluetooth LE HID may communicate its value of $V_B$ to the Bluetooth controller 202 using other suitable mechanisms.

Next, the calculated radio signal path loss ($P_L$) can be compared against a threshold path loss (T). If the radio signal path loss is less than the threshold path loss (e.g., if $P_L<7$), the target Bluetooth LE HID is considered to be within the threshold distance of the Bluetooth controller 202 and Bluetooth Touch is deemed to be detected at the Bluetooth controller 202. However, if the radio signal path loss is greater than the threshold path loss (e.g., if $P_L>7$), the target Bluetooth LE HID is considered to be outside the threshold distance of the Bluetooth controller 202. If it is determined that the target Bluetooth LE HID is not within the threshold distance of the Bluetooth controller 202, the flow continues at block 414. Otherwise, if it is determined that the target Bluetooth LE HID is within the threshold distance of the Bluetooth controller 202, the flow continues at block 416.

At block 414, the received packet is discarded at the Bluetooth controller. The flow 400 moves from block 412 to block 414 if the LE HID filter 210 determines that the target Bluetooth LE HID is not within the threshold distance of the Bluetooth controller 202. Accordingly, the LE HID filter 210 can discard the received packet and can continue to check whether the target Bluetooth LE HID is within the threshold distance of the Bluetooth controller 202. From block 414, the flow ends.

At block 416, a communication link is established with the target Bluetooth LE HID. The flow 400 moves from block 412 to block 416 if the LE HID filter 210 determines that the target Bluetooth LE HID is within the threshold distance of the Bluetooth controller 202. Accordingly, the LE HID filter 210 can prompt the LE HID layer 212 to establish a communication link with the target Bluetooth LE HID (e.g., a Bluetooth mouse). The LE HID layer 212 can execute suitable operations to setup and pair the Bluetooth host device 230 (e.g., an electronic device that comprises the Bluetooth controller 202) with the target Bluetooth LE HID. For example, the LE HID layer 212 can send a reply packet to the target Bluetooth LE HID (e.g., the Bluetooth mouse) that transmitted the advertising packet at block 406. In the reply packet, the LE HID layer 212 can indicate intent to connect to the target Bluetooth LE HID. The LE HID layer 212 can initiate a connection between the Bluetooth host device 230 and the target Bluetooth LE HID, transmit a request to use the target Bluetooth LE HID's services, etc. Additionally, the LE HID layer 212 (or the LE HID filter 210) can store the configuration information associated with the target Bluetooth LE HID. This can enable the target Bluetooth LE HID to be re-connected with the Bluetooth controller 202 and the host device 230 without re-executing one or more connection operations (e.g., pairing operations). The flow continues at block 418.

At block 418, data is exchanged with the target Bluetooth HID via the established communication link. For example, after the connection and pairing procedures are complete, the target Bluetooth LE HID (e.g., the Bluetooth mouse) and the Bluetooth host device 230 can exchange data via the communication link established at block 416. In some embodiments, the LE HID layer 212 can transmit data received from the target Bluetooth LE HID (e.g., the Bluetooth-enabled keyboard/mouse) to the host device 230 via the USB interface 218. The data received from the target Bluetooth LE HID can be indicative of which key/button was pressed, how the mouse was moved, etc. From block 418, the flow ends.

It should be understood that FIGS. 1-4 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. Although FIG. 4 describes the LE HID filter 210 analyzing every received packet, embodiments are not so limited. In some embodiments, the LE HID filter 210 can analyze the received packet to determine whether the packet was transmitted by a Bluetooth HID only if the target Bluetooth device is sufficiently close to the host Bluetooth device (e.g., if the LE HID filter 210 determines that advertising packets from the target Bluetooth device are being received continuously). Furthermore, although not depicted in FIG. 4, it should be noted that in some embodiments, after it is determined that the target Bluetooth LE HID is within the threshold distance of the Bluetooth controller 202, it can be determined whether the target Bluetooth LE HID was previously paired with the Bluetooth controller 202. If so, the target Bluetooth LE HID can be re-connected with the host device 230 using previously stored configuration information and without re-executing the pairing operations. The operations described herein for automatic pairing and connection of Bluetooth LE HIDs can be employed so that users can utilize the Bluetooth LE HIDs (e.g., Bluetooth-enabled keyboards, Bluetooth-enabled mice, etc.) directly without first configuring the Bluetooth LE HIDs using cable/USB devices. The operations described herein for automatic pairing and connection of Bluetooth LE HIDs can also be employed to replace a previously connected Bluetooth LE HID with a new Bluetooth LE HID. Thus, after the new Bluetooth LE HID is paired with and connected to the host device, the new Bluetooth LE HID (e.g., a new Bluetooth-enabled keyboard) can replace the old Bluetooth LE HID (e.g., an old/damaged Bluetooth-enabled keyboard).

In some embodiments, the Bluetooth controller 202 can be configured so that the host device 230 is communicatively coupled with one Bluetooth-enabled keyboard and one Bluetooth-enabled mouse. Thus, the Bluetooth controller 202 can execute the operations described above in FIG. 4 until one Bluetooth-enabled keyboard and one Bluetooth-enabled mouse are detected, paired with, and connected to the host device 230. In other embodiments, other suitable number and type of Bluetooth LE HIDs may be detected, paired, and coupled with the host device 230.

In some embodiments, electronic devices that use Bluetooth LE HIDs may conserve bandwidth for other Bluetooth connections. For example, when a user attempts to connect Bluetooth LE HIDs to an electronic device (e.g., connect a Bluetooth mouse to a laptop computer), the Bluetooth LE HID connections should not interfere with other Bluetooth connections (e.g., connections between an audio headset and the laptop computer, file transfers, etc.). In some embodiments, data communications of multiple Bluetooth LE HIDs associated with the electronic device can be combined into a single communication. For example, if the electronic device is coupled with a Bluetooth LE-enabled keyboard and a Bluetooth LE-enabled mouse, a data transaction of the Bluetooth LE-enabled keyboard can be compacted into a data transaction of the Bluetooth LE-enabled mouse. This can reduce fragmentation of the communication bandwidth, thus improving the performance of the electronic device.

In some embodiments, a compact LE design can be implemented for optimizing data communications along multiple HID communication links (i.e., multiple communication links between the host device and corresponding multiple Bluetooth LE HIDs). Packets exchanged via the HID communication links ("HID packets") are typically very small and the time interval between transmitting two consecutive HID packets ("inter-packet time interval") can be much larger than the length of the individual HID packet. Typically, a transmission inter frame spacing (TIFS) indicated by the Bluetooth specification may be much smaller than the inter-packet time interval. Consequently, the Bluetooth controller can be configured to reduce the inter-packet time interval by reducing the inter-packet time interval so that the inter-packet time interval is equal to (or slightly greater than) the TIFS indicated by the Bluetooth specification. Suppose that a first communication link is established between a Bluetooth-enabled keyboard and the Bluetooth controller and a second communication link is established between a Bluetooth-enabled mouse and the Bluetooth controller. The Bluetooth controller can transmit a first HID packet via the first communication link to the Bluetooth-enabled keyboard, wait for the reduced inter-packet time interval, and then transmit a second HID packet via the second communication link to the Bluetooth-enabled mouse. This can reduce the amount of time that the communication medium is idle, allow for quick responses/communication with the connected Bluetooth LE HIDs (e.g., the Bluetooth-enabled keyboard and the Bluetooth-enabled mouse), and improve efficiency of the host device. It is noted that the configuration and operations of the connected Bluetooth LE HIDs need not be modified.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
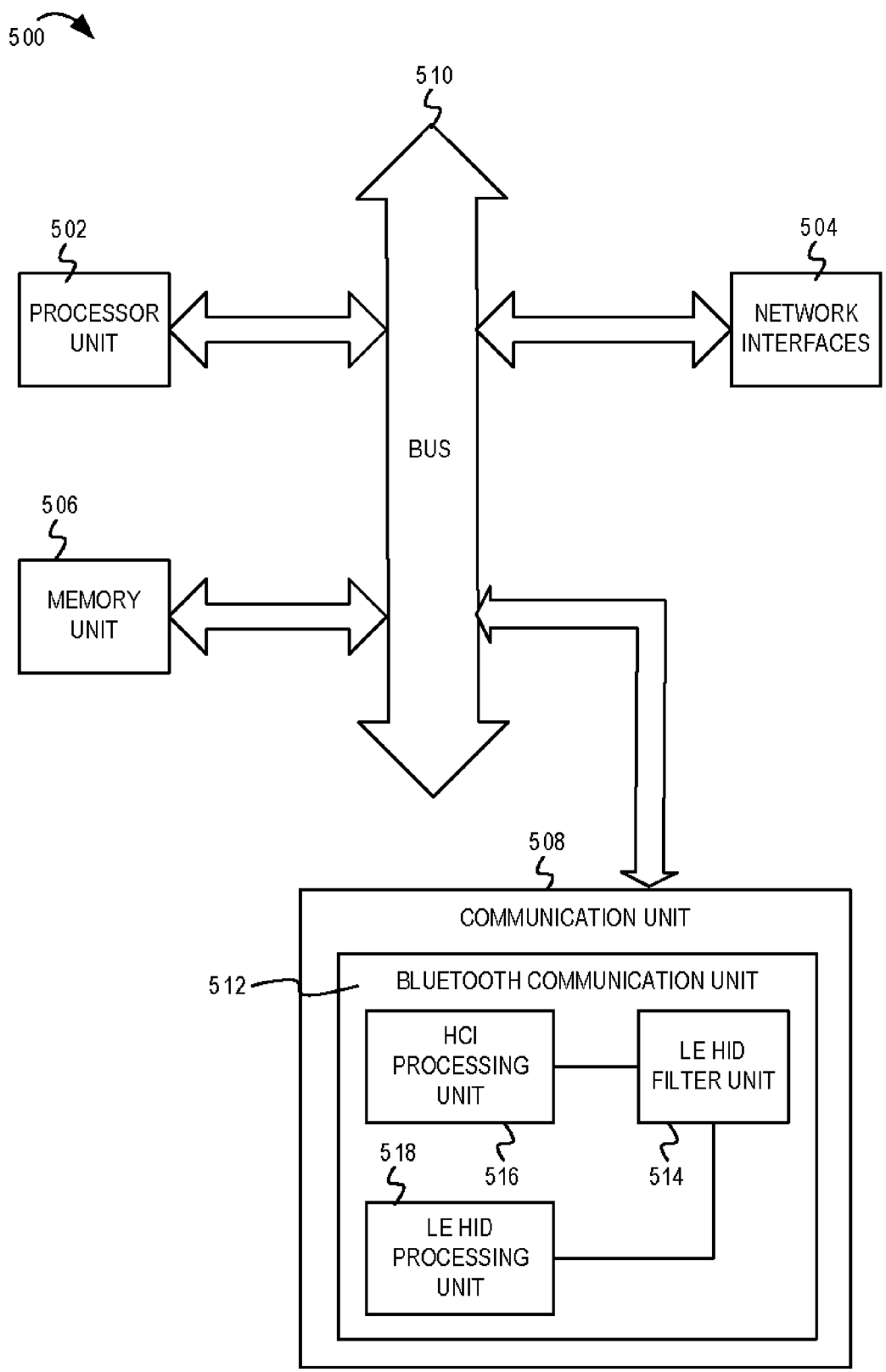
FIG. 5 is a block diagram of one embodiment of an electronic device including a mechanism for automatic pairing/configuration of Bluetooth LE HIDs.

FIG. 5 is a block diagram of one embodiment of an electronic device 500 including a mechanism for automatic pairing/configuration of Bluetooth LE HIDs. In some implementations, the electronic device 500 may be one of a notebook computer, a desktop computer, a tablet computer, a netbook, a mobile phone, a gaming console, a personal digital assistant (PDA), or other electronic systems comprising device communication unit with wireless (or wired) communication capabilities (e.g., Bluetooth communication capabilities). The electronic device 500 includes a processor unit 502 (possibly including multiple processors, multiple cores, multiple nodes, and/or implementing multi-threading, etc.). The electronic device 500 includes a memory unit 506.

The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, AHB, AXI, etc.), and network interfaces 504 that include at least one of a wireless network interface (e.g., a Bluetooth interface, a WLAN 802.11 interface, a WiMAX interface, a ZigBee® interface, a Wireless USB interface, etc.) and a wired network interface (e.g., an Ethernet interface, a powerline communication interface, etc.).

The electronic device 500 also includes a communication unit 508. The communication unit 508 comprises at least a Bluetooth communication unit 512 (e.g., a Bluetooth controller). The Bluetooth communication unit 512 comprises an LE HID filter unit 514, an HCI processing unit 516, and an LE HID processing unit 518. The LE HID filter unit 514 can execute functionality for automatic pairing and connection with Bluetooth LE HIDs, as described above with reference to FIGS. 1-4. Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 504 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, a low energy mechanism for automatic connection of Bluetooth HIDs as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method for establishing a communication link between a host device and a Bluetooth device, the method comprising:

executing, at a Bluetooth controller associated with the host device, background scan operations to detect the Bluetooth device;

receiving a Bluetooth packet at the Bluetooth controller from the Bluetooth device;

determining, by a Bluetooth low energy (LE) human interface device (HID) filter of the Bluetooth controller, whether the received Bluetooth packet is a Bluetooth LE HID packet type; and providing, by the Bluetooth LE HID filter, the received Bluetooth packet to a Bluetooth LE HID module of the Bluetooth controller if the received Bluetooth packet is the Bluetooth LE HID packet type, and providing, by the Bluetooth LE HID filter, the received Bluetooth packet to a Bluetooth host controller interface (HCI) module of the Bluetooth controller if the received Bluetooth packet is not the Bluetooth LE HID packet type.

2. The method of claim 1, further comprising:

in response to determining that the received Bluetooth packet is the Bluetooth LE HID packet type, determining whether the Bluetooth device is within a threshold distance of the Bluetooth controller; and in response to determining that the Bluetooth device is within the threshold distance of the Bluetooth controller, executing one or more connection operations to establish the communication link between the Bluetooth device and the host device.

3. The method of claim 2, further comprising:

storing configuration information associated with the Bluetooth device for subsequent reconnection between the Bluetooth device and the host device.

4. The method of claim 2, wherein said determining whether the Bluetooth device is within the threshold distance of the Bluetooth controller is based on at least one member selected from the group consisting of a received signal strength indicator (RSSI) associated with the received Bluetooth packet, a radio signal path loss, and near field communication (NFC) signal detection.

5. The method of claim 2, wherein said determining whether the Bluetooth device is within the threshold distance of the Bluetooth controller comprises:

determining a radio signal path loss value associated with the Bluetooth device based, at least, in part, on a transmit power associated with the Bluetooth device, a radio signal loss value associated with an antenna of the Bluetooth controller, and a radio signal loss value associated with an antenna of the Bluetooth device;

comparing the radio signal path loss value associated with the Bluetooth device against a threshold path loss; and determining that the Bluetooth device is within the threshold distance of the Bluetooth controller in response to determining that the radio signal path loss value associated with the Bluetooth device is less than the threshold path loss, or determining that the Bluetooth device is not within the threshold distance of the Bluetooth controller, in response to determining that the radio signal path loss value associated with the Bluetooth device exceeds the threshold path loss.

6. The method of claim 5, further comprising:

determining the transmit power associated with the Bluetooth device and the radio signal loss value associated with the antenna of the Bluetooth device from the received Bluetooth packet.

7. The method of claim 2, wherein in response to determining that the Bluetooth device is not within the threshold distance of the Bluetooth controller, the method further comprises:

discarding the received Bluetooth packet at the Bluetooth controller; and monitoring subsequent transmissions from the Bluetooth device to determine whether the Bluetooth device is within the threshold distance of the Bluetooth controller.

8. The method of claim 2, wherein said providing the received Bluetooth packet to the Bluetooth LE HID module of the Bluetooth controller is in response to determining that the Bluetooth device is within the threshold distance of the Bluetooth controller.

9. The method of claim 1, further comprising:

after providing the received Bluetooth packet to the Bluetooth LE HID module of the Bluetooth controller, executing one or more connection operations to establish the communication link between the Bluetooth device and the host device, wherein said executing one or more connection operations includes mapping communications associated with the Bluetooth device to a corresponding USB HID of the host device through a USB interface of the Bluetooth controller.

10. The method of claim 1, wherein said determining whether the received Bluetooth packet is the Bluetooth LE HID packet type comprises:

determining whether the Bluetooth device that transmitted the received Bluetooth packet is a Bluetooth LE HID, based at least in part, on one or more fields of the received Bluetooth packet.

11. The method of claim 10, wherein the one or more fields of the received Bluetooth packet comprise at least a service universally unique identifier (UUID) of the received Bluetooth packet.

12. A first Bluetooth device comprising:

a host device; and a Bluetooth controller associated with the host device, the Bluetooth controller configured to:

execute background scan operations to detect a second Bluetooth device;

determine, by a Bluetooth low energy (LE) human interface device (HID) filter, whether a Bluetooth packet received at the Bluetooth controller is a Bluetooth LE HID packet type;

in response to a determination that the received Bluetooth packet is the Bluetooth LE HID packet type, determine, by the Bluetooth LE HID filter, whether the second Bluetooth device is within a threshold distance of the Bluetooth controller;

in response to a determination that the second Bluetooth device is within the threshold distance of the Bluetooth controller, provide, by the Bluetooth LE HID filter, the received Bluetooth packet to a Bluetooth LE HID module of the Bluetooth controller, and execute one or more connection operations to establish a communication link between the second Bluetooth device and the host device.

13. The first Bluetooth device of claim 12, wherein the Bluetooth controller configured to execute one or more connection operations to establish the communication link between the second Bluetooth device and the host device further comprises the Bluetooth controller configured to:

map communications associated with the second Bluetooth device to a corresponding USB HID of the host device through a USB interface of the Bluetooth controller.

14. The first Bluetooth device of claim 12, wherein, in response to a determination that the second Bluetooth device is not within the threshold distance of the Bluetooth controller, the Bluetooth controller is configured to:
discard the received Bluetooth packet; and
monitor subsequent transmissions from the second Bluetooth device to determine whether the second Bluetooth device is within the threshold distance of the Bluetooth controller.

15. The first Bluetooth device of claim 12, wherein, in response to a determination that the received Bluetooth packet is not the Bluetooth LE HID packet type, the Bluetooth controller is configured to:
provide the received Bluetooth packet to a Bluetooth host controller interface (HCI) module of the Bluetooth controller.

16. A method for establishing a communication link between a host device and a Bluetooth device, the method comprising:
receiving, at a Bluetooth controller associated with the host device, a Bluetooth packet from the Bluetooth device;
determining, by a Bluetooth low energy (LE) human interface device (HID) filter of the Bluetooth controller, whether the received Bluetooth packet is a Bluetooth LE HID packet type;
in response to determining that the received Bluetooth packet is the Bluetooth LE HID packet type, determining, by the Bluetooth LE HID filter, whether the Bluetooth device is within a threshold distance of the Bluetooth controller; and
in response to determining that the Bluetooth device is within the threshold distance of the Bluetooth controller,
providing, by the Bluetooth LE HID filter, the received Bluetooth packet to a Bluetooth LE HID module of the Bluetooth controller, and
establishing the communication link between the host device and the Bluetooth device.

17. The method of claim 16, further comprising:
executing, at the Bluetooth controller, background scan operations to detect the Bluetooth device, wherein said receiving the Bluetooth packet at the Bluetooth controller is in response to said executing the background scan operations.

18. The method of claim 16, wherein:
in response to determining that the received Bluetooth packet is not the Bluetooth LE HID packet type, providing the received Bluetooth packet to a Bluetooth host controller interface (HCI) module of the Bluetooth controller.

19. The method of claim 16, further comprising:
mapping communications associated with the Bluetooth device to a corresponding USB HID of the host device through a USB interface of the Bluetooth controller.

20. A Bluetooth controller comprising:
a memory; and
a processor coupled with the memory and configured to:
execute background scan operations to detect a Bluetooth device for establishing a communication link between the Bluetooth device and a host device associated with the Bluetooth controller;
determine, by a Bluetooth low energy (LE) human interface device (HID) filter, whether a Bluetooth packet received at the Bluetooth controller is a Bluetooth LE HID packet type;
in response to a determination that the received Bluetooth packet is the Bluetooth LE HID packet type, provide, by the Bluetooth LE HID filter, the received Bluetooth packet to a Bluetooth LE HID module of the Bluetooth controller; and
in response to a determination that the received Bluetooth packet is not the Bluetooth LE HID packet type, provide, by the Bluetooth LE HID filter, the received Bluetooth packet to a Bluetooth host controller interface (HCI) module of the Bluetooth controller.

21. The Bluetooth controller of claim 20, wherein the processor is further configured to:
determine whether the Bluetooth device is within a threshold distance of the Bluetooth controller in response to a determination that the received Bluetooth packet is the Bluetooth LE HID packet type; and
execute one or more connection operations to establish the communication link between the Bluetooth device and the host device in response to a determination that the Bluetooth device is within the threshold distance of the Bluetooth controller.

22. The Bluetooth controller of claim 21, wherein the processor configured to determine whether the Bluetooth device is within the threshold distance of the Bluetooth controller comprises the processor configured to:
determine a radio signal path loss value associated with the Bluetooth device based, at least in part, on a transmit power associated with the Bluetooth device, a radio signal loss value associated with an antenna of the Bluetooth controller, and a radio signal loss value associated with an antenna of the Bluetooth device;
compare the radio signal path loss value associated with the Bluetooth device against a threshold path loss;
determine that the Bluetooth device is within the threshold distance of the Bluetooth controller, in response to a determination that the radio signal path loss value associated with the Bluetooth device is less than the threshold path loss; and
determine that the Bluetooth device is not within the threshold distance of the Bluetooth controller, in response to a determination that the radio signal path loss value associated with the Bluetooth device exceeds the threshold path loss.

23. The Bluetooth controller of claim 21, wherein in response to the determination that the Bluetooth device is not within the threshold distance of the Bluetooth controller, the processor is further configured to:
discard the received Bluetooth packet; and
monitor subsequent transmissions from the Bluetooth device to determine whether the Bluetooth device is within the threshold distance of the Bluetooth controller.

24. The Bluetooth controller of claim 21, wherein the processor configured to provide the received Bluetooth packet to the Bluetooth LE HID module of the Bluetooth controller is in response to the determination that the Bluetooth device is within the threshold distance of the Bluetooth controller.

25. The Bluetooth controller of claim 20, wherein, after providing the received Bluetooth packet to the Bluetooth LE HID module of the Bluetooth controller, the processor is further configured to:
execute one or more connection operations to establish the communication link between the Bluetooth device and the host device, wherein the processor configured to execute one or more connection operations includes the processor configured to map communications associated with the Bluetooth device to a corresponding USB HID of the host device through a USB interface of the Bluetooth controller.

26. A non-transitory machine-readable storage media having instructions stored therein, which when executed by one or more processors of a Bluetooth controller cause the Bluetooth controller to perform operations for establishing a communication link between a host device and a Bluetooth device that comprise:
   executing, at the Bluetooth controller associated with the host device, background scan operations to detect the Bluetooth device;
   determining, by a Bluetooth low energy (LE) human interface device (HID) filter of the Bluetooth controller, whether a Bluetooth packet received at the Bluetooth controller is a Bluetooth LE HID packet type;
   in response to determining that the received Bluetooth packet is the Bluetooth LE HID packet type, providing, by the Bluetooth LE HID filter, the received Bluetooth packet to a Bluetooth LE HID module of the Bluetooth controller; and
   in response to determining that the received Bluetooth packet is not the Bluetooth LE HID packet type, providing, by the Bluetooth LE HID filter, the received Bluetooth packet to a Bluetooth host controller interface (HCI) module of the Bluetooth controller.

27. The non-transitory machine-readable storage media of claim 26, wherein the operations further comprise:
   in response to determining that the received Bluetooth packet is the Bluetooth LE HID packet type, determining whether the Bluetooth device is within a threshold distance of the Bluetooth controller; and
   in response to determining that the Bluetooth device is within the threshold distance of the Bluetooth controller, executing one or more connection operations to establish the communication link between the Bluetooth device and the host device.

28. The non-transitory machine-readable storage media of claim 27, wherein said operation of determining whether the Bluetooth device is within the threshold distance of the Bluetooth controller comprises:
   determining a radio signal path loss value associated with the Bluetooth device based, at least in part, on a transmit power associated with the Bluetooth device, a radio signal loss value associated with an antenna of the Bluetooth controller, and a radio signal loss value associated with an antenna of the Bluetooth device;
   comparing the radio signal path loss value associated with the Bluetooth device against a threshold path loss;
   determining that the Bluetooth device is within the threshold distance of the Bluetooth controller, in response to determining that the radio signal path loss value associated with the Bluetooth device is less than the threshold path loss; and determining that the Bluetooth device is not within the threshold distance of the Bluetooth controller, in response to determining that the radio signal path loss value associated with the Bluetooth device exceeds the threshold path loss.

29. The non-transitory machine-readable storage media of claim 26, wherein, after providing the received Bluetooth packet to the Bluetooth LE HID module of the Bluetooth controller, the operations further comprise:
   executing one or more connection operations to establish the communication link between the Bluetooth device and the host device, wherein said executing one or more connection operations includes
      mapping communications associated with the Bluetooth device to a corresponding USB HID of the host device through a USB interface of the Bluetooth controller.

* * * * *